United States Patent [19]

Grimes, Jr. et al.

[11] Patent Number: 4,999,146
[45] Date of Patent: Mar. 12, 1991

[54] PROCESS FOR MANUFACTURE OF LOW DENSITY POLYTETROFLUOROETHYLENE INSULATED CABLE

[75] Inventors: William F. Grimes, Jr., South Salem; John A. Dunn, Buchanan, both of N.Y.

[73] Assignee: Thermax Wire Corp., Flushing, N.Y.

[21] Appl. No.: 478,846

[22] Filed: Feb. 12, 1990

[51] Int. Cl.$^5$ .............................................. B29C 47/02
[52] U.S. Cl. .................................. 264/127; 264/174; 264/288.8; 425/113
[58] Field of Search ...................... 264/127, 174, 209.1, 264/209.7, 288.8, 41; 425/380, 393, 379.1, 113; 156/244.12

[56] References Cited

U.S. PATENT DOCUMENTS

| | | | |
|---|---|---|---|
| 2,834,054 | 5/1958 | Maddock et al. | 264/209.7 |
| 2,938,234 | 5/1960 | Slade | 264/127 |
| 2,945,265 | 7/1960 | Sell, Jr. et al. | 264/174 |
| 3,008,187 | 11/1961 | Slade | 264/127 |
| 3,260,774 | 7/1966 | Harlow | 264/127 |
| 4,225,547 | 9/1980 | Okita | 264/209.7 |
| 4,250,138 | 2/1981 | Okita | 264/127 |
| 4,529,564 | 7/1985 | Harlow | 264/127 |
| 4,826,725 | 5/1989 | Harlow | 264/127 |

Primary Examiner—Jeffery Thurlow
Attorney, Agent, or Firm—Charles E. Temko

[57] ABSTRACT

An improved process for manufacturing low density polytetrofluoroethylene insulated cable using a paste type extrudate to form a hollow tube of insulated material extruded about a wire conductor which passes through the extrusion die. As contrasted with earlier methods, the shaped extrudate paste is stretched before removing the extrusion aid substantially at ambient temperature with only residual heat imparted by extrusion by a driven pulley, the peripheral speed of which may be varied in accordance with the speed of the extrudate. With the completion of the stretching, the increased outer surface and porosity of the extrudate permits faster removal of the extrusion aid immediately prior to entering a sintering oven.

6 Claims, 1 Drawing Sheet

PROCESS FOR MANUFACTURE OF LOW DENSITY POLYTETROFLUOROETHYLENE INSULATED CABLE

BACKGROUND OF THE INVENTION

This invention relates generally to the field of paste extrusion of low density polytetrofluoroethylene to form elongated articles such as hollow tubes and insulated conductors. More particularly, it relates to an improved method for forming such articles which will substantially increase the speed of production, and thus lower the cost of manufacture without sacrificing quality.

The process of extruding polytetrofluoroethylene by paste forming of dispersion polymerised resin is well known commercially. In this process, the extrudate is formed of powdered polytetrofluoroethylene material with an extrusion aid forming 10 to 30 percent of the volume of the extrudate and passed through an extrusion die forming part of a ram extruder to form a hollow tube or filament, tape or other shaped article. The hollow tube may be extruded about a continuous length of wire which passes through a guide tube, the outer end of which is positioned in the land of the die, thus forming an insulated conductor. A Harlow U.S. Pat. No. 4,529,564, granted July 16, 1985 discloses a variation of this process in which the extrudate is passed through driven nip rollers to regulate the speed of the extrudate with the conductor moving at a fixed speed, and the extrudate initially moving at a slower speed prior to stretching, but moving at the same speed once the stretching operation has been accomplished. In the Harlow patent, the tube is heated to a first degree for extrusion aid removal, to a higher degree during stretching, and finally to a still higher degree for sintering.

As suggested in the Okita U.S. Pat. No. 4,225,547, it is possible to manipulate the extrudate before removal of the extrusion aid, without the addition of heat beyond that provided by the extrusion die. More importantly, it has an appreciable strength in the extrusion direction, as a result of being passed through the extrusion die. Okita, however, did not appreciate that a volumetric expansion could be effected by stretching. The Okita patent, however, teaches how to adjust wall thickness and diameter of the tubing without effect on density.

In the Harlow Patent, the product is produced on a continuous basis, but it is apparently unappreciated that the polytetrofluoroethylene can be stretched before removing the extrusion aid and without additional heat. Because of this, the Harlow method requires three separate heated zones, the first of which is employed solely to remove the extrusion aid, the second of which is used to elevate the temperature of the now dried extrudate to promote stretching, and, finally, a third zone is used to sinter the product in stretched condition.

SUMMARY OF THE INVENTION

The object of the present invention is the inclusion of voids in the finished product for the purpose of enhanced dielectric and physical properties, such as increased signal speed and reduced density in the extruded tube.

Briefly stated, the invention contemplates the provision of an improved method for extruding low density polytetrofluoroethylene. The product may be about a continuous length of wire conductor substantially in accordance with conventional practice. The method is substantially simplified by performing the stretching or manipulating the extrudate after leaving the die but prior to removal of the extrusion aid, and without the use of heat other than that imparted to the extrudate at the extrusion die. Because the extrusion aid is still present in the extrudate, and a degree of fibrosity has been imparted by extrusion, the stretching is accomplished without difficulty. As a consequence, the heated stretching zone employed in the prior art method can be eliminated. Extrusion aid removal occurs subsequently, just prior to sintering, and because the extrudate has already been stretched, it is substantially more porous at the point of extrusion aid removal than prior art products, and evaporation of the extrusion aid takes place more rapidly, with less applied heat energy required to accomplish the purpose. The subsequent sintering step is conventional.

BRIEF DESCRIPTION OF THE DRAWING

In the drawing, to which reference will be made in the specification.

DETAILED DESCRIPTION OF THE DISCLOSED EMBODIMENT

Figure 1:
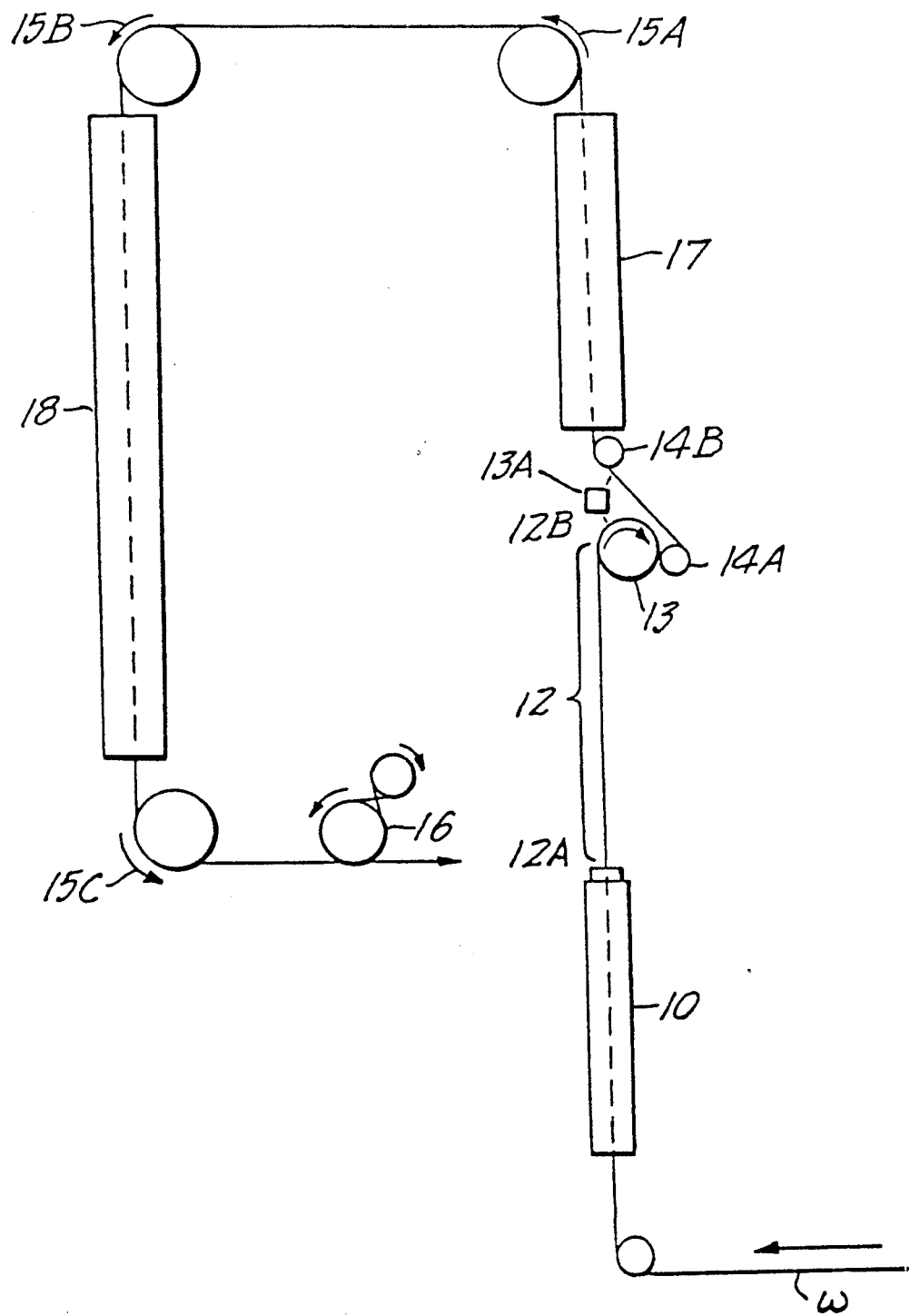
FIG. 1 is a schematic elevational view of a device for accomplishing the disclosed process.

Referring to the drawing, reference character 10 designates a ram extruder commonly used for polytetrofluoroethylene wire coating extrusion, the details of which form no part of the present disclosure. Extruders of this type include a compression chamber through which a continuous length of wire W is introduced so that the extrudate flows around the wire as it progresses through the land of an extrusion die (not shown).

Reference character 12 designates a span in which the extrudate, still containing an extrusion aid, is continuously stretched from a lower end 12a, at which point the extrudate is moving at a slower rate than the wire W, to an upper end 12b such that by the time the extrudate reaches point 12b it is moving at the same speed as the wire W. Pulley 13 is positively driven by a variable speed motor 13a at an angular velocity equivalent to the constant speed of the wire W. All of the stretching of the extrudate is completed over the length of the span 12, normally without the assistance of nip rollers or similar regulating devices. As the extrudate passes over the pulley 13, it is now moving at the same speed as the wire W.

The product subsequently passes about idler pulleys 14a and 14b, 15a, 15b and 15c, and capstan 16 which is driven synchronously with the pulley 13. Disposed between the pulley 14b and pulley 15a is a vaporizing oven 17 which is generally conventional, but less applied heat energy is now required for vaporization of the extrusion aid than in the prior art because the extrudate is now in a stretched and porous condition as it enters this vaporizing zone.

Vaporization in oven 17 and sintering in oven 18 can now take place in a conventional manner. The conductor and insulation continues to move at the same speed following pulley 13. Sintering is performed at normal temperatures, above the crystaline melt point of the material, generally about 327° C.

Because the stretching is performed over a fixed and known span under the influence of the driven pulley 13, the rate and amount of stretch is capable of fine control and, more importantly, the range of permissible operational speed, with less energy input, is markedly improved as contrasted with the prior art method. Only two heated zones are needed to be monitored, rather than three.

The following examples are illustrative:

EXAMPLE 1

A porous PTFE product described in this example was produced as follows:

(A) PTFE Fluorocarbon Resin (F-201 Dakin U.S. Corporation).

(B) Extrusion Aid V M & P Naptha.

(C) After incorporation of the extrusion aid with the PTFE a preform of a 1¼" in diameter was made under low pressure.

(D) The conductor was 7/38 (30 AWG) Silver Plated Copper 0.012" Nom Diameter.

(E) The Die used had a land diameter of 0.070" and a length of approximately 0.25".

(F) The needle tip had a O.D. of 0.024" and an I.D. of 0.013".

(G) The reduction ratio of the set-up was 328.

(H) The extruder used had a nominal diameter of a 1 and ¼". The barrel was not heated, but the die was heated to a temperature between 150°-200° F.

(I) Stretching Zone: (distance between the die exit and the driven pulley) was at ambient temperature.

(J) Vaporization Zone, used to drive off the lubricant ranged in temperature between 400°-500° F.

(K) Sintering zone: In this zone the temperature of the PTFE must rise above the crystalline melting point of PTFE which is 327° C. (620.6° F.). Oven temperatures were between 700°-800° F.

(L) Relative extrusion pressure while running was 200 psi. Extrusion was commenced, the wire speed (capstan speed), extrudate speed, and driven pulley speed were equivalent. For this example all were set at 30 FPM (531 RPM). After the insulated wire reached the driven pulley, the capstan and driven pulley were simultaneously increased to a speed of 65 FPM (the insulation speed remaining at 531 RPM, 30 FPM). The speed differential caused the PTFE to expand. The resulting product was a cured porous PTFE product which had a finished diameter of 0.0535" and a void content of 59% per unit volume.

EXAMPLE 2

Basically the same procedure as in Example 1 was employed with the exception of the base resin. The PTFE designation used was T6C-(DuPont Specialty Polymers Division).

The resulting product was again a cured porous PTFE product. The final O.D. was 0.0525" and had a void content of 57.2%, per unit volume.

EXAMPLE 3

A third example was run to obtain a product with a higher void content than the product run in Example 1. All parameters remained the same with the exception of the extrudate speed, this was reduced from 30 FPM (531 RPM) to approximately 23 FPM (407 RPM). The resulting product showed little reduction in cross-sectional area, but a significant reduction in weight. The product had a final O.D. of 0.051" and a void content of 72.5%, per unit volume.

EXAMPLE 4

(A) PTFE Fluorocarbon Resin (F-201 Dakin U.S. Corp.)

(B) Extrusion Aid VM & P Naptha.

(C) Preform Diameter 1".

(D) Conductor: 1/32 silver plated copper (008" Nom. Dia)

(E) Needle Tip: 0.020"×0.010".

(F) Die: 0.036" Land diameter, 0.25" land length (G) Reduction Ratio: 811.1

(H) Extruder barrel not heated, but the die was heated to approx. 200° F.

(I) Stretching Zone: (distance between the die exist and the driven pulley) was at ambient temp.

(J) Vaporizing Zone: 500°-550° F.

(K) Sintering Zone: 700°-800° F.

(L) Relative extrusion pressure while running was 112 PSI;

Extrusion was commenced starting with the line (capstan) speed equivalent to the extrudate speed which was approx 30 FPM (325 RPM) the capstan and driven pulley were then simultaneously increased to 110 FPM. The resulting product was cured porous PTFE product which had a finished O.D. of 0.028" and a void content of 63%, per unit volume.

EXAMPLE 5

The basic set-up was similar to that in Example 4 with the following exceptions:

(A) Conductor: 7/44 (36f AWG) Silver Plated Copper.

(B) Needle Tip: 0.018"×0.008".

(C) Die: 0.030" land Diameter, approx. 0.25" land length.

(D) Reduction Ratio: 1150:1

(E) The running speed of the product was 120 FPM.

This set-up yielded a porous PTFE product which had a finished O.D. of 0.022" and a void content of 53%, per unit volume.

Although the embodiments described illustrates specific applications to insulated wire and cable, those skilled in the art may find similar useful applications in the fabrication of hollowed tubes, rods, tapes and/or other shapes without departing from the spirit of the invention.

We claim:

1. In a method of forming an electrical conductor having a central core of conductive wire, and an insulative covering of low density sintered polytetrofluoroethylene including the steps of forcing an extrudate of unsintered polytetrofluoroethylene and extrusion aid through a die while reducing the cross section of said mixture, and forming a central opening in the extrudate which surrounds the wire upon exiting from said die; and subsequently passing said tube with the conductor therein through the serial steps of removing the extrusion aid, stretching said tube to obtain volumetric expansion using a driven pulley, and sintering said tube while maintaining the same in stretched condition, the improvement comprising:

(a) stretching said tube before removal of the extrusion aid to its ultimate length corresponding to the length of wire disposed therein;

(b) subsequently removing the extrusion aid while said tube is in stretched condition, and;

(c) thereafter sintering said tube while maintaining the same in stretched condition.

2. The improvement set forth in claim 1 in which said stretching takes place substantially at ambient temperature with only residual heat imparted by extrusion.

3. The improvement set forth in claim 1, in which said extrusion aid is removed after stretching by heating in an oven maintained at a temperature below the flash point of said extrusion aid.

4. The improvement set forth in claim 1, in which the stretching of the tube is accomplished by a driven pulley over which the tube passes, the peripheral speed of which corresponds to the speed of the wire conductor.

5. The improvement set forth in claim 1, in which the extrusion aid is V.M.P. Naptha.

6. In an apparatus for extruding a hollow tube of unsintered low density polytetrofluoroethylene containing an extrusion aid from an extruder device upon an inextensible wire core in which said tube is subsequently stretched in an longitudinal direction, the extrusion aid is removed and the tube is sintered, the improvement comprising: a driven pulley having a peripheral speed equal to the speed of the wire exiting from the extruder device, said pulley being spaced from the extruder a distance sufficient to provide a stretching zone such that said tube is in fully stretched condition at the point of engagement with said pulley, second and third idler pulleys and a synchronously driven capstan serially receiving said tube from said driven pulley; a first oven positioned between said driven pulley and said first idler pulley for removing said extrusion aid, and a second oven positioned between said second idler pulley and said driven capstan for sintering said tube.

* * * * *